United States Patent [19]

Schroeder

[11] Patent Number: 5,575,312

[45] Date of Patent: Nov. 19, 1996

[54] FIRE RETARDING HEATING AND COOLING DUCT

[75] Inventor: Clifford A. Schroeder, Westlake Village, Calif.

[73] Assignee: CASCO Manufacturing, San Fernando, Calif.

[21] Appl. No.: 568,529

[22] Filed: Dec. 7, 1995

Related U.S. Application Data

[63] Continuation of Ser. No. 268,327, Jun. 30, 1994, abandoned.

[51] Int. Cl.⁶ ........................................ F16L 9/14
[52] U.S. Cl. .......................... 138/149; 138/131; 138/133; 138/178
[58] Field of Search ................................... 138/149, 177, 138/178, 132, 133, 131; 285/187, 922; 137/72, 74, 75; 52/232; 428/913

[56] References Cited

U.S. PATENT DOCUMENTS

| | | | |
|---|---|---|---|
| 3,216,459 | 11/1965 | Schroeder et al. | 138/149 |
| 3,289,703 | 12/1966 | Brown | 138/149 |
| 3,557,840 | 1/1971 | Maybee | 138/149 |
| 3,665,967 | 5/1972 | Kachnik | 138/149 |
| 3,677,303 | 7/1972 | Martin | 138/149 |
| 3,818,948 | 6/1974 | Hedges | 138/149 |
| 3,830,899 | 8/1974 | Piccioli et al. | 138/149 |
| 3,885,593 | 5/1975 | Koerber et al. | 138/149 |
| 3,897,087 | 7/1975 | Neilson | 52/232 |
| 4,040,165 | 8/1977 | Miessler et al. | 138/149 |
| 4,143,671 | 3/1979 | Olson | 285/187 |
| 4,351,366 | 9/1982 | Angioletti | 138/149 |
| 4,351,682 | 9/1982 | McGuire | 156/149 |
| 4,400,228 | 8/1983 | Gentry | 138/149 |
| 4,410,014 | 10/1983 | Smith | 138/149 |
| 4,417,603 | 11/1983 | Argy | 138/149 |
| 4,559,745 | 12/1985 | Wexler | 52/232 |
| 4,735,235 | 4/1988 | Anderson et al. | 138/149 |

*Primary Examiner*—Patrick Brinson
*Attorney, Agent, or Firm*—David O'Reilly

[57] ABSTRACT

A fire retarding heating and cooling duct to impede the progress of fires in buildings and houses. The fire retarding duct is comprised of a duct core covered with a heat meltable plastic material that will melt at temperatures in the range of 180° F. and above. The duct core is preferably constructed in short sections of about six feet for connection between heating and cooling, and building inlet and outlet plenums. The heat meltable plastic duct covering melts almost immediately when a building fire enters a plenum preventing the spread of a fire throughout the duct system.

9 Claims, 1 Drawing Sheet

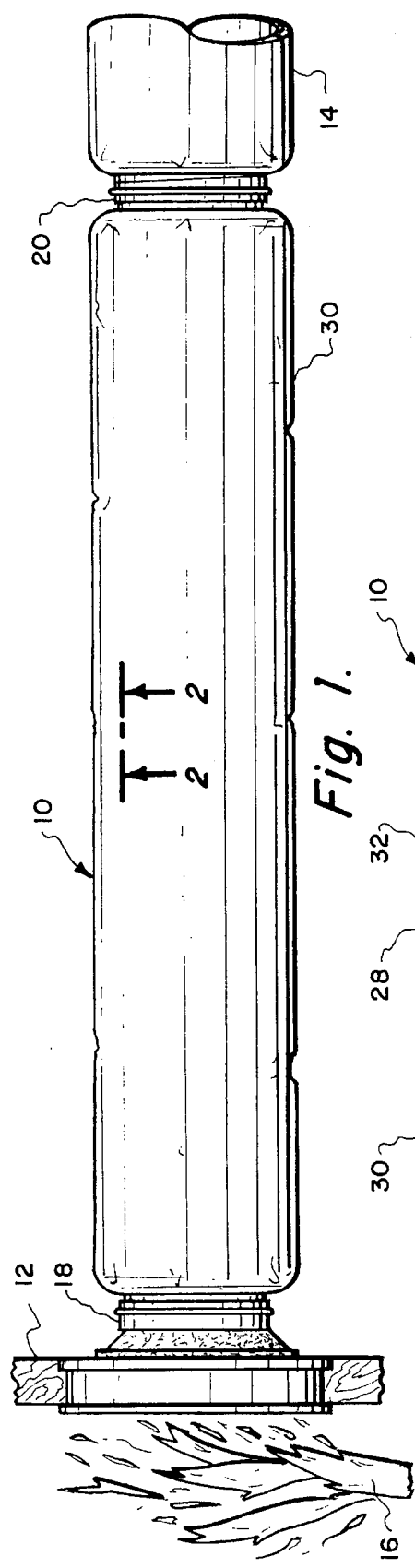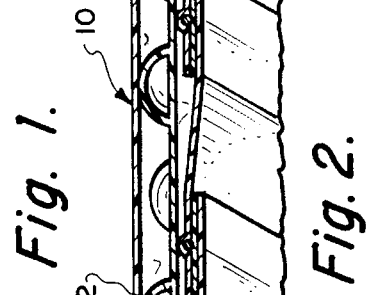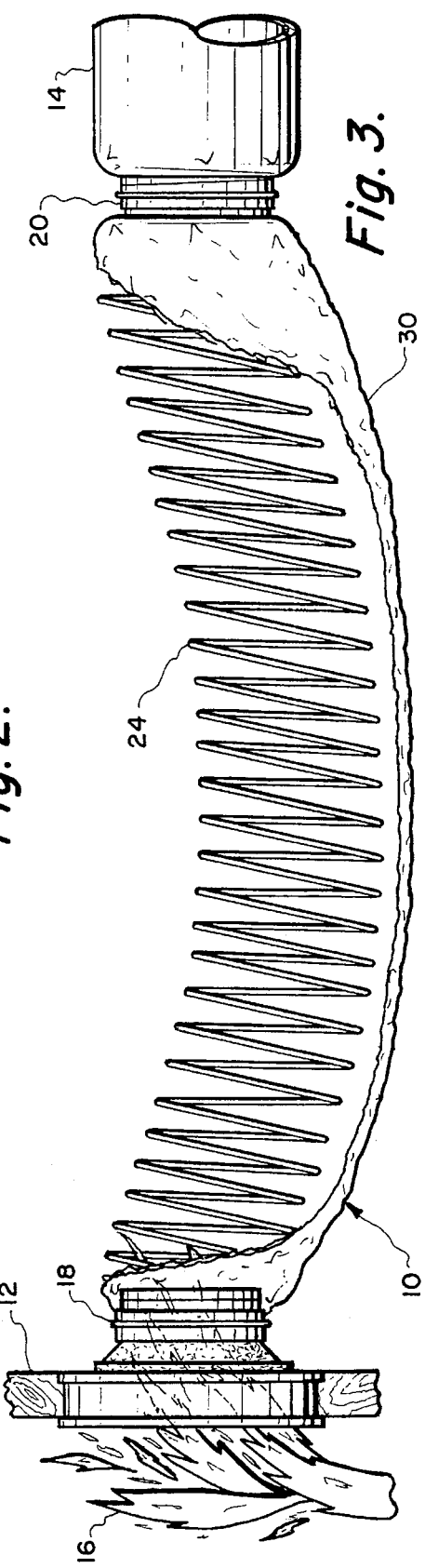

FIRE RETARDING HEATING AND COOLING DUCT

This is a continuation of application Ser. No. 08/268,327 filed on Jun. 30, 1994 now abandoned.

FIELD OF THE INVENTION

This invention relates to fire safety and fire retarding devices, and more particularly relates to a fire retarding flexible duct.

BACKGROUND OF THE INVENTION

While all fires cannot be prevented, anything that can be done to slow the spread of a fire can considerably save valuable property, not to mention lives. Building fires, once ignited, can spread quickly throughout the building from room to room or floor to floor. Many methods and devices have been conceived and are presently in use to impede the process of a fire as much as possible. Such things as fire retarding doors and walls can significantly slow the progress of a fire. Dampers that automatically close during a fire have also been helpful.

Fire doors and walls are constructed of dense material that will not burn easily and that will slow the progress of a fire sufficiently to minimize damage. Such doors and walls are required between garage areas and the living areas of residential properties because of the significant danger of fire in garages. It is safe to say that more fires probably start in garage areas than anywhere else in the home. by impeding the progress of a fire properly, more lives may be saved. Slowing down the spread of fire often gives fire fighters that extra period of time that can be the difference between a total loss and a substantial savings in loss of life and valuable property.

A lack of combustible material or oxygen can impede the progress of a fire and prevent a total loss of life and valuable property.

A lack of combustible material can slow down a fire, and a lack of oxygen can quickly snuff out a fire. Where there is a combustible material the spreading of a fire in a building or home can depend upon the fires voracious appetite for oxygen. Fires that may not be much more than smoldering embers will almost literally explode with a huge dose of oxygen. For that reason, fire fighters are very cautious about opening doors and windows because the rush of air can fan the flames from a relentless burn to a roaring inferno. Cut off or reduce the air, and the fire can only spread slowly.

It is a fire's voracious appetite for air that makes heating and cooling ducts a ready avenue for the spread of fires. With fire walls and doors impeding the progress of a fire, the flames will rush to any source of oxygen available. As a fire "licks up" available oxygen, any opening becomes a conduit for the flames to spread. The consumption of available oxygen will cause a rush of air through these openings to feed the fire which will then rapidly advance through the opening to "gobble-up" the air. Thus, heating and air conditioning ducts become a pathway to the rapid spread of building and home fires. A great deal of valuable property has been lost due to the spread of fires through these ducts. Adjoining buildings or rooms could be saved were it not for this ready pathway for the fire to spread. For that reason, it would be advantageous to provide a heating and air conditioning duct that retards the spread of fires.

It is therefore the object of the invention to provide a heating and cooling duct that blocks the path of a fire and retards its spread by roaring down the duct to adjoining buildings or rooms.

Yet another object of the present invention is to provide a heating and cooling duct that collapses to prevent the spread of fire.

Still another object of the invention is to provide a heating or cooling duct that literally melts at a temperature substantially below the combustion or melting temperature of a building heating and cooling duct it is connected to in order to retard the spread of a fire.

Yet another object of the invention is to provide a heating and cooling flexible duct formed of the wire reinforced duct core and wrapped with a heat meltable material that quickly disintegrates from the heat of a fire.

Still another object of the invention is to provide a heat meltable flexible duct section that can be connected between an air supply or return to connect the existing duct. A three to six foot section should be sufficient to retard spreading of a fire to adjacent areas or buildings.

BRIEF DESCRIPTION OF THE INVENTION

The purpose of this invention is to provide a heating and cooling duct that effectively blocks the spread of fires by disintegrating when subjected to the heat of a fire.

The fire retarding heating and cooling duct is comprised of a flexible duct cone such as that shown in U.S. Pat. Nos. 3,216,459 and 4,351,682 incorporated herein by reference. The duct core is formed of a helical wire coil encapsulated in a plastic material wound in a spiral around the helical wire coil. Preferably, a plastic material is used that is thin and flexible, and will easily melt when subjected to the high temperatures.

The flexible wire reinforced duct core is wrapped with a heat meltable insulating material and covered with a flexible plastic tubular jacket. Preferably, the heat meltable insulation is a material that will melt at temperatures that exceed normal temperatures of building heating systems. Since building fires are generally very hot, a melting temperature of about 180° F. to 200° F., or above should be sufficient. Flames sucked into a heating and cooling duct through a plenum would far exceed this, and the duct would collapse very quickly retarding spread of the fire.

The above and other novel features of the invention will be more fully understood from the following detailed description and the accompanying drawings, in which:

BRIEF DESCRIPTION OF THE DRAWINGS

FIG. 1 is a side elevation of a fire retarding duct section for connection to an existing heating and cooling duct system.

FIG. 2 is a sectional view taken at 2—2 of FIG. 1.

FIG. 3 is a side elevation of the fire retardant duct system of FIG. 1 shown collapsing from the heat of a building fire.

DETAILED DESCRIPTION OF THE INVENTION

A fire retarding heating and cooling duct 10 is shown generally in FIG. 1. Fire retarding heating and cooling duct 10 is connected between plenum 12 which may be an air intake or return plenum, and existing duct system 14. Only a short section of fire retarding duct 10 is necessary to retard the spread of a building fire throughout the duct system. Fires spread through heating and cooling duct systems because of their search for oxygen to consume. As they consume the oxygen, a draft is created rapidly drawing a building fire 16 into the duct system. With fire retarding duct section 10, rapid spread of the fire through the duct system is prevented.

Fire retarding duct 10 is shown in greater detail in FIG. 2, and is comprised of collars 18 and 20 on each end to connect to plenum 12 and existing duct system 14. Duct core 22 may be constructed in a manner shown and described in U.S. Pat. Nos. 3,216,459 and 4,351,682 owned by the same assignee as the invention disclosed herein. Duct core 22 is comprised of a helical wire coil 24 encapsulated in a heat meltable flexible plastic material 26. Duct core 22 is then covered with a heat meltable plastic material 28 and an outer plastic cover 30 which is also preferably a heat meltable material. A suitable material for heat meltable cover 28 would be a plastic material having insulating air filled bubbles 32, sometimes referred to as "bubble-plex." Preferably, this material would melt at a temperature approximately above 180° F. to prevent damage from normal heating systems which provide hot air at substantially lower temperatures.

The fire retarding effect of the heating and cooling duct section 10 is illustrated in FIG. 3. A building fire 16, in its search for combustible material and oxygen, will enter air intake or return plenum 12 at the entrance to fire retarding duct 10. Since the temperatures of these fires is substantially above the normal temperatures these ducts encounter heat meltable plastic cover 28 will melt along with outer cover 30 causing the duct to collapse leaving only helical coil 24 exposed. Thus, building fire 16 cannot spread through the existing heating and cooling system 14.

An advantage of the fire retarding system shown is that the progress of a fire will be substantially impeded and only a short section of heating duct will need to be replaced. For example, fire retarding duct is preferably on the order of three to six feet and will be sufficient to prevent a fire from progressing throughout the heating and cooling duct system. When fire retarding duct 10 collapses as shown in FIG. 3, the plastic will melt, and may even completely shut off the duct preventing the fire from spreading into the walls and open areas of a building. After building fire 16 is extinguished, fire retarding duct sections 10 can be easily replaced by removing the collapsed duct and inserting a new section between intake or return plenum 12 and existing duct system 14.

This invention is not to be limited by the embodiment shown in the drawings and described in the description which is given by way of example and not of limitation, but only in accordance with the scope of the appended claims.

What is claimed is:

1. A fire retarding heating and cooling duct comprising;
    a flexible duct core comprised of a heat meltable flexible plastic reinforced with a helical wire;
    a heat meltable insulation wrapped around said duct core;
    a heat meltable jacket enclosing said duct core and said heat meltable insulation;
    said fire retarding heating and cooling duct being constructed in short sections for mounting between a plenum and an end of a building heating and cooling duct;
    said heat meltable duct core, insulation and jacket being meltable at a temperature substantially below the combustion or melting temperature of the building heating and cooling duct it is connected to;
    mounting means for joining the ends of said section of fire retarding heating and cooling duct to said plenum at one end and to said building and cooling duct at the other end;
    whereby said section of heating and cooling duct will collapse when excessive heat from a building fire enters said plenum, thereby preventing the fire from spreading through the building heating and cooling duct.

2. The duct according to claim 1 wherein said heat meltable insulation wrapped around said flexible duct core is a heat meltable plastic.

3. The duct according to claim 2 wherein said heat meltable plastic is a heat meltable plastic having air filled bubbles.

4. The duct according to claim 1 wherein said section of fire retarding heating and cooling duct has a length that is less than about six feet long.

5. The duct according to claim 3 wherein said section of fire retarding heating and cooling duct includes duct collars for connecting said section of fire retarding heating and cooling duct between said plenum and an end of said building heating and cooling duct.

6. The duct according to claim 1 wherein said duct core is comprised of a helically wound reinforcing encapsulated with a heat meltable flexible plastic material.

7. A fire retarding heating and cooling duct comprising;
    a flexible duct core comprised of a heat meltable flexible plastic reinforced with a helical wire;
    a heat meltable insulation wrapped around said duct core, said heat meltable insulation comprising a heat meltable plastic having air filled bubbles;
    a heat meltable jacket enclosing said duct core and said heat meltable insulation;
    said fire retarding heating and cooling duct being constructed in short sections for mounting between a plenum and an end of a building heating and cooling duct;
    said heat meltable duct core, insulation and jacket being meltable at a temperature substantially below the combustion or melting temperature of the building heating and cooling duct it is connected to;
    mounting means for joining the ends of said section of fire retarding heating and cooling duct to said plenum at one end and to said building and cooling duct at the other end, said mounting means comprising duct collars at each end of said section of fire retarding heating and cooling duct;
    whereby said section of heating and cooling duct will collapse when excessive heat from a building fire enters said plenum, thereby preventing the fire from spreading through the building heating and cooling duct.

8. The duct according to claim 7 wherein said section of fire retarding heating and cooling duct is less than about six feet long.

9. The duct according to claim 7 wherein said duct core is comprised of a helically wound reinforcing wire encapsulated by a heat meltable flexible plastic material.

* * * * *